Figure 1:
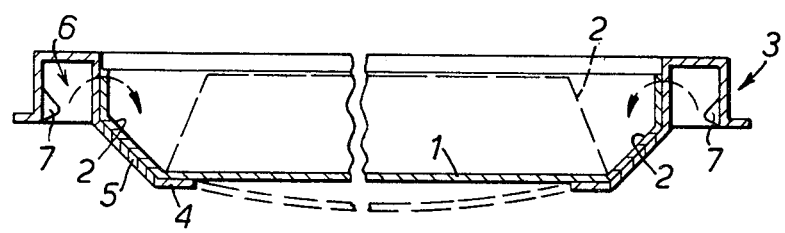

United States Patent [19]
Sutch

[11] 3,956,550
[45] May 11, 1976

[54] COMPOSITE CLOSURE MEMBER

[75] Inventor: Brian Leo Chudleigh Sutch, Thames Ditton, England

[73] Assignee: Airfix Industries Limited, London, England

[22] Filed: Dec. 27, 1973

[21] Appl. No.: 428,854

[30] Foreign Application Priority Data
Jan. 1, 1973 United Kingdom............... 45845/73
Mar. 22, 1973 United Kingdom............... 14018/73

[52] U.S. Cl. ................................. 428/81; 156/85; 156/242; 229/2.5 R; 229/43; 215/246; 264/230; 264/279

[51] Int. Cl.² ................... B23B 3/02; B29C 27/00; B65D 5/64

[58] Field of Search ............. 161/44; 264/230, 266, 264/279; 156/85, 75, 242; 215/246, 317; 229/43, 2.5; 428/81

[56] References Cited
UNITED STATES PATENTS

| | | | |
|---|---|---|---|
| 2,885,105 | 5/1959 | Heyl et al. ..................... | 264/230 X |
| 3,154,617 | 10/1964 | Schenk et al. ..................... | 264/266 |
| 3,402,874 | 9/1968 | Sternau ........................... | 215/246 X |
| 3,408,902 | 11/1968 | De Voe............................. | 220/43 X |
| 3,417,539 | 12/1968 | Hirohama ......................... | 215/246 |
| 3,493,458 | 2/1970 | Santangello...................... | 156/75 X |

*Primary Examiner*—Philip Dier
*Attorney, Agent, or Firm*—Scrivener Parker Scrivener and Clarke

[57] ABSTRACT

A composite product such as a lid for a container comprises a sheet material blank and a peripheral moulding formed thereon, wherein a marginal portion of the blank is displaced to project from the general plane of the central panel of the blank and the peripheral moulding includes an inner marginal portion bonded to the said marginal portion of the blank and is shaped so that on longitudinal shrinkage of the moulding the central panel of the blank will bow in a direction conforming with the direction of displacement of the marginal portion of the blank.

8 Claims, 5 Drawing Figures

COMPOSITE CLOSURE MEMBER

This invention is concerned with improvements in and relating to the production of composite products, which comprise a flexible blank such as paper, card, synthetic plastic or metal and a moulded shape defining or connecting portion moulded in contact with the blank.

In particular the invention relates to such products in which a blank panel is surrounded by a peripheral element such as a rim or connecting device. Such products include lids.

If a planar panel is clamped, in planar condition, in a mould cavity which includes a peripheral channel for receiving synthetic injection molded thermoplastic material to make a rim round the panel, the resultant product will buckle in a fashion which will render the product commercially unacceptable. The reason is that the peripheral moulding shrinks. Typical known plastics for use as injection molded rim material in accordance with the present invention are described in the patent to Santangelo U.S. Pat. No. 3,493,458.

According to one aspect of the present invention, there is provided a composite article including a blank of sheet material and a peripheral moulding wherein a marginal portion of the blank is displaced out of the general plane of the central panel thereof and the peripheral moulding includes an inner marginal portion bonded to a portion at least of the marginal portion of the blank and is shaped to displace the inner marginal portion thereof on longitudinal shrinkage in a direction to cause the main panel to bow in a predetermined direction.

According to another aspect of the invention there is provided a method of making a composite article including a blank of sheet material and a peripheral moulding, wherein a marginal portion of the blank is displaced out of the general plane of the central panel thereof and the peripheral moulding is formed on the blank, includes an inner marginal portion bonded to a portion at least of the marginal portion of the blank, and is shaped to displace the inner marginal portion thereof on longitudinal shrinkage in a direction to cause the main panel to bow in a predetermined direction.

In the preferred embodiment the peripheral moulding is shaped to cause the central panel of the blank to bow in the direction of displacement of the marginal portion of the blank.

Figure 2:
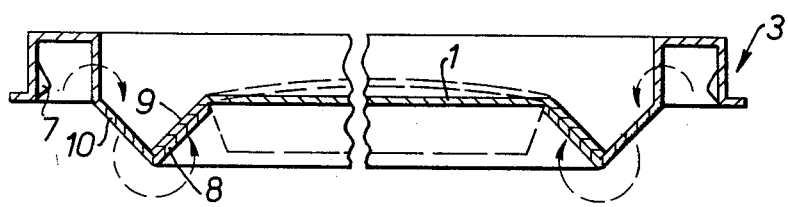
Figure 3:
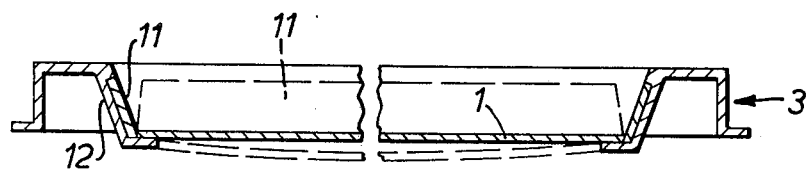
Figure 4:
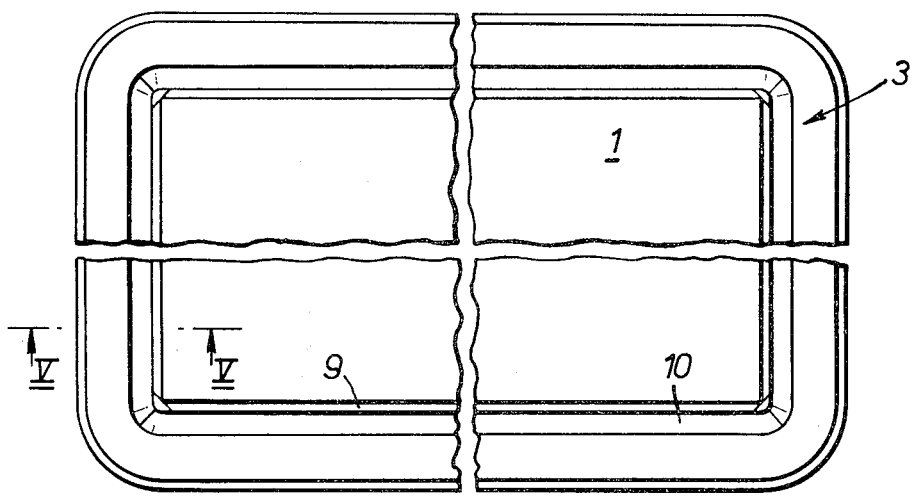
Figure 5:
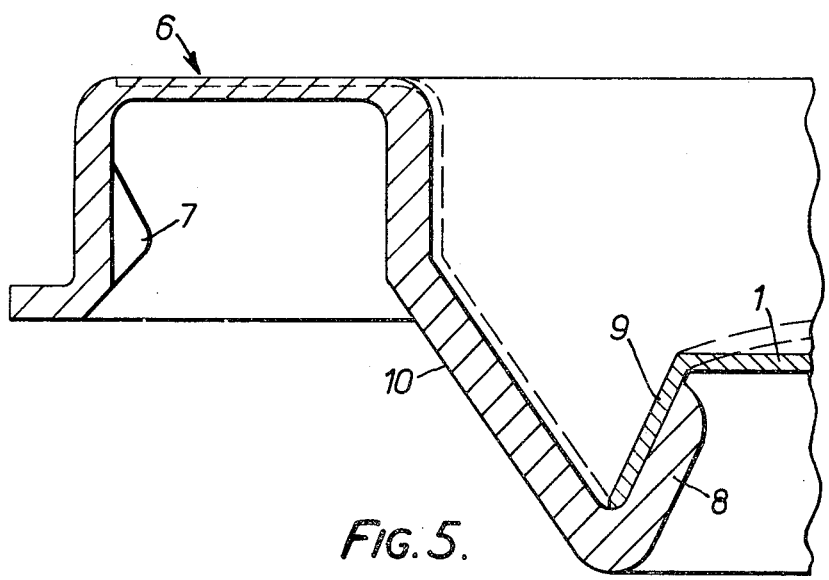

The invention will be better understood from the following description of embodiments thereof, given by way of example only, with reference to the accompanying drawings, in which:

FIGS. 1 to 3 are sections through embodiments of lids according to the invention, FIG. 4 is a plan view of the lid of FIG. 2 and, FIG. 5 is an enlarged section along the line V—V of FIG. 4.

Referring to FIG. 1 the lid is made of a generally rectangular blank having a main panel 1 and marginal portions 2 extending along the four edges of the main panel and defined by cutting away the corners of a rectangular blank. The marginal portions are displaced, preferably through an angle greater than 10°, relative to the main panel 1. The blank so shaped is trapped between a core tool and a cavity tool which also define a channel section cavity for forming a peripheral moulding 3. This moulding when formed has an inner marginal portion which includes a portion 4 adhering to the main panel and a portion 5 conforming to and adhering to each edge marginal portion 2.

The outer part or remainder 6 of the moulding 3 is shaped suitably to engage a container. Here the shape is a channel section with any suitable means, such as lugs 7, which will engage under corresponding means, such as lugs or a lip, on the container. When the moulding is completed it shrinks longitudinally and the effect of this shrinkage is to an extent resisted by the blank to which the moulding is bonded. As a result, the moulding tends to pivot inwardly as shown by the arrows which in turn causes the blank main panel to bow, as indicated by broken lines, to conform to the displacement of the marginal portions.

Referring to FIG. 2 the moulding 3 has an inner marginal portion 8 which conforms to a displaced marginal portion 9 of the blank, but here the moulding has a portion 10 reversed relative to the inner part 8 to form a V section portion with portion 8. Upon shrinkage the effect of the portion 10 is that the moulding tends to rotate at inner portion 8 as shown by the arrows and thereby causes the main panel of the blank to bow to the position shown in broken lines, to again conform to the displacement of the marginal portions 9.

Dependent on the thickness of the moulding 3 and of the blank the angle of displacement of the marginal portions of the blank required to achieve this predetermined bowing will vary, but for card thickness of the order of 0.010 inches, the angle should be at least 10° and may be 60° or more.

If desired the marginal portions of the blank may be extended by a reversely displaced portion forming a V-section and may be further extended to the top of the moulding and then outwardly across the top of the moulding as indicated by a broken line in FIG. 5. However if the reverse displacement is provided, while the resultant crease in the blank will resist longitudinal shrinkage much more and although the main panel will bow in the required direction, the main panel in the corner regions may buckle in the opposite sense which is in some fields unacceptable. Referring to FIG. 3, the blank has a displaced marginal portion 11 to which a marginal portion 12 of the moulding 3 conforms. Here again the moulding on shrinkage will tend to pivot inwards and thereby bow the main panel 1 to the broken line configuration to conform to the displacement of the marginal portions. The advantage of this construction as in the constructions shown in FIGS. 1 and 2 is that there is a single displacement of the blank edge panels and the bowing will be in the same sense throughout the panel.

In producing the above described lids to ensure that the injected synthetic plastic material flows consistently to the desired face of the blank exposed to the flow, the cavity defining the moulding is formed to give a preferred flow path along which the material will flow round the cavity and from which it will flow inwardly and outwardly to fill the remainder of the cavity. For example in the embodiment illustrated in FIG. 4 the material will flow around the cavity along a path corresponding to the thickest portion 10 of the moulding and having run round this portion it will flow inwardly across the free edge of the blank portion 9 rather than along it and this will result in the plastic material being on the underface of the portion 9.

I claim:

1. A composite closure member comprising a generally planar blank of sheet material having a marginal part contiguous to the planar part of the blank angularly displaced out of the plane of the blank, a continuous rim of substantially rigid injection moulded thermo-plastic material surrounding the displaced marginal part of the blank, and said planar part of the blank being bowed upon shrinkage by the bonded displaced marginal part of the blank.

2. A closure member as claimed in claim 1 wherein the margin of the blank is displaced in a single direction relative to the general plane of the blank so as to make an obtuse angle with that plane.

3. A closure member as claimed in claim 1 wherein the margin of the blank extends from the general plane of the blank in a first direction making an obtuse angle with said plane and then in a second direction at an angle to the first direction.

4. A closure member according to claim 3 wherein the margin of the blank has a generally V-section and the inner margin of the moulding has a corresponding V-section to which the margin of the blank is bonded.

5. A closure member according to claim 1 wherein the moulding includes a generally V-section portion, the margin of the blank being bonded to the leg of the V-section inwardly directed relative to the closure periphery.

6. A closure member according to claim 1 wherein the moulding includes a channel section portion to receive a lip defining the opening to be closed.

7. A closure member according to claim 6 said margin of the blank being bonded to the inner arm of the channel section portion.

8. A closure member according to claim 7 said margin extending and being bonded to the base of the channel section portion.

* * * * *